United States Patent [19]

Rohlfing et al.

[11] Patent Number: 4,767,028
[45] Date of Patent: Aug. 30, 1988

[54] ROTARY VALVE

[75] Inventors: Raymond G. Rohlfing; Donald D. Norwood, both of Bartlesville, Okla.

[73] Assignee: Phillips Petroleum Company, Bartlesville, Okla.

[21] Appl. No.: 144,368

[22] Filed: Jan. 15, 1988

Related U.S. Application Data

[63] Continuation-in-part of Ser. No. 557,515, Nov. 2, 1983.

[51] Int. Cl.[4] ............................................. G01F 11/22
[52] U.S. Cl. .................................... 222/219; 422/219; 137/240
[58] Field of Search ............... 137/4, 15, 240, 246.22; 222/602, 605, 219, 145, 249; 422/131, 132, 213, 219

[56] References Cited

U.S. PATENT DOCUMENTS

| | | | |
|---|---|---|---|
| 2,427,680 | 9/1947 | Leonard | 222/219 X |
| 2,885,246 | 5/1959 | De Haven | |
| 2,888,040 | 5/1959 | Terwilliger et al. | 137/165 |
| 3,026,894 | 3/1962 | Brooks | 137/240 |
| 3,139,996 | 7/1964 | Welty | 214/17 |
| 3,167,398 | 1/1965 | Whittington | 23/285 |
| 3,219,208 | 11/1965 | Hadley et al. | 214/17 |
| 3,329,319 | 7/1967 | Isaac | 222/219 |
| 3,332,440 | 7/1967 | Brakebill | 137/595 |
| 3,720,233 | 3/1973 | Shur et al. | 137/625.17 |
| 3,846,394 | 11/1974 | Mitacek | 260/93.7 |
| 4,244,389 | 1/1981 | Shimoura et al. | 137/117 |
| 4,414,999 | 11/1983 | Basta | 137/605 X |
| 4,464,056 | 8/1984 | Schmitz et al. | 366/134 |
| 4,501,286 | 2/1985 | Rohlfing | 137/15 |
| 4,506,696 | 3/1985 | von Pechmann | 137/246.11 |
| 4,687,381 | 8/1987 | Sumain et al. | 422/131 X |
| 4,690,804 | 9/1987 | Rohlfing | 422/219 |

FOREIGN PATENT DOCUMENTS

| | | | |
|---|---|---|---|
| 384269 | 8/1922 | Fed. Rep. of Germany | 222/219 |
| 1134853 | 8/1962 | Fed. Rep. of Germany | 222/219 |

Primary Examiner—A. Michael Chambers
Assistant Examiner—John C. Fox
Attorney, Agent, or Firm—Williams, Phillips & Umphlett

[57] ABSTRACT

A rotating metering valve having a transverse passage which carries a slidable piston reciprocating once for each revolution of the valve for metering particulate material from an inlet port to an outlet port is provided with a dumbbell shaped piston and a purge fluid port in the transverse passage to ensure reliable operation, even while metering small quantities of particulate.

11 Claims, 2 Drawing Sheets

ROTARY VALVE

RELATED APPLICATIONS

This application is a continuation-in-part of application Ser. No. 557,515, filed Nov. 2, 1983.

BACKGROUND OF THE INVENTION

The present invention relates generally to apparatus for controlling the flow of material. In one aspect the invention relates to an improved valve for controlling the flow of material therethrough. In another aspect the invention relates to apparatus suitable for use as a feeder for controlling the flow of material therethrough. A more specific aspect of the invention relates to the feeding of particulate catalyst to a catalytic reactor system.

The apparatus of the present invention is an improvement over the valve or feeder mechanisms disclosed in U.S. Pat. Nos. 3,219,208 and 3,139,996. Particulate catalyst, such as chromium oxide deposited on silica or silica-alumina, is relatively abrasive, and it has been found that feeder mechanisms for such catalyst are subject to undesirable wear between the rotary valve plug or rotor and the valve body in which the valve plug or rotor is carried. Such wear can cause both leakage of catalyst into the valve chamber through spaces worn between the valve plug or rotor and the valve body and increased operating torque required to rotate the valve plug or rotor relative to the valve body where the catalyst is in slurry form. Problems with plugging of the feeder can cause shutdown for cleaning. Plugging problems are worsened where the feeder conveys small slugs of catalyst, as in the case where a high productivity catalyst is used.

OBJECTS OF THE INVENTION

Accordingly, it is an object of the present invention to provide apparatus which overcomes the deficiencies of previous feeder mechanisms.

Another object of the invention is to provide a valve structure which overcomes the problem of material leakage between the valve member and the valve body.

Yet another object of the invention is to provide a valve structure suitable for controlling the feeding of particulate material.

Still another object of the invention is to provide a valve structure wherein torque required to rotate the valve member relative to the valve body is minimized.

Another object of the invention is to provide a valve structure suitable for controlling the feeding of abrasive particulate material which minimizes abrasive wear between the valve member and sealing surfaces carried by the valve body.

Another object of this invention is to provide a method and apparatus suitable for reliably metering solids in slurry form to a process unit.

Another object of this invention is to provide method and apparatus for metering small slugs of slurry to a process unit in a reliable manner.

Yet another object of the invention is to provide a valve structure which is simple and economical in construction and in operation.

A further object of the invention is to provide a method of controlling the flow of material, such as, for example, particulate catalyst, through a feeder mechanism which is simple, economical and reliable in operation.

SUMMARY OF THE INVENTION

The present invention contemplates a valve for controlling the passage of material therethrough. The valve comprises a valve body defining a valve chamber and having an inlet port and an outlet port, with each of the ports communicating between the valve chamber and the exterior of the valve body. Preferably, an annular inlet seal is mounted in the valve chamber at the outlet of the inlet port and has an inlet passage therethrough communicating in sealing engagement with the inlet port. In a similar manner, it is also preferred that an annular outlet seal is mounted in the valve chamber at the inlet to the outlet port and has an outlet passage therethrough communicating in sealing engagement with the outlet port. A valve member having a longitudinal axis and first and second opposite ends is disposed within the valve chamber and is closely received between the inlet port and the outlet port, by the inlet and outlet seals when present. The valve member is adapted to rotate about its longitudinal axis within the valve chamber. The valve member has a preferably frustoconically shaped outer surface in slidable sealing engagement with respective preferably corresponding frustoconically shaped sealing surfaces of the inlet and outlet seals. The valve member has a transverse first passage extending through the longitudinal axis, and a generally longitudinally extending second passage which intercepts the first transverse passage. The maximum diameter of the transverse passage at its communication with frustoconically shaped outer surface of the valve member in the preferred embodiment is less than the minimum width of the preferred frustoconically shaped sealing surfaces across which the transverse passage is revolved during rotation of the valve member about its longitudinal axis. A dumbbell-shaped piston is positioned in the transverse passage. The valve is further preferably provided with means for drivingly securing the valve member to drive means for rotating the valve member about its longitudinal axis with the valve chamber. Biasing means are preferably provided for urging the frustoconically shaped outer surface of the valve member used in the preferred embodiment into slidable sealing engagement with the respective corresponding frustoconically shaped sealing surfaces of the inlet and outlet seals used in the preferred embodiment. The valve may include a passage communicating between the exterior of the valve body and the inlet port upstream of the inlet seal, as well as means in fluid flow communication between the passage and a source of fluid whereby fluid from the source can flow through the passage into the inlet port so as to assist in flushing the material downstream through the transverse passage in the valve.

The present invention further contemplates a method of controlling the passage of material through a structure which can be of the general type described above which includes introducing material into a first end of the transverse passage from the inlet port, displacing a dumbbell-shaped piston from a first position adjacent the inlet port to a second position adjacent the outlet port with the thus introduced particulate material, thereby forming a slug of particulate material having a predetermined volume in a portion of the transverse passage adjacent the inlet port, and then aligning the first end of the transverse passage with the outlet port and flowing the slug of particulate material from the transverse passage via the outlet port while flowing purge fluid around the piston to clean the passage.

Other objects, aspects and advantages of the invention will be evident from the following detailed description when read in conjunction with the accompanying drawings.

DETAILED DESCRIPTION OF THE INVENTION

Figure 1:
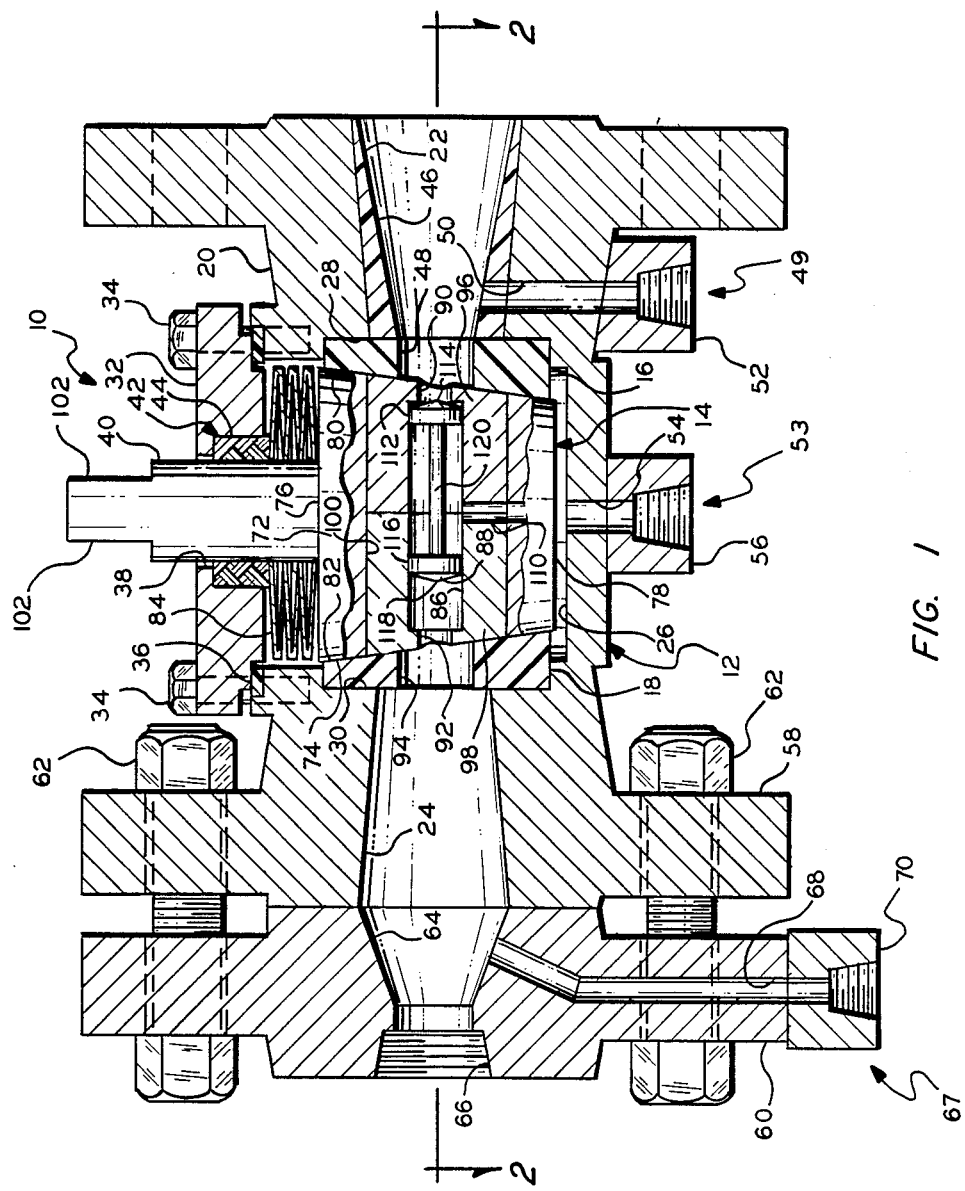
FIG. 1 is a vertical cross-sectional view taken along the longitudinal center line of a feeder valve structure constructed in accordance with the present invention.
Figure 2:
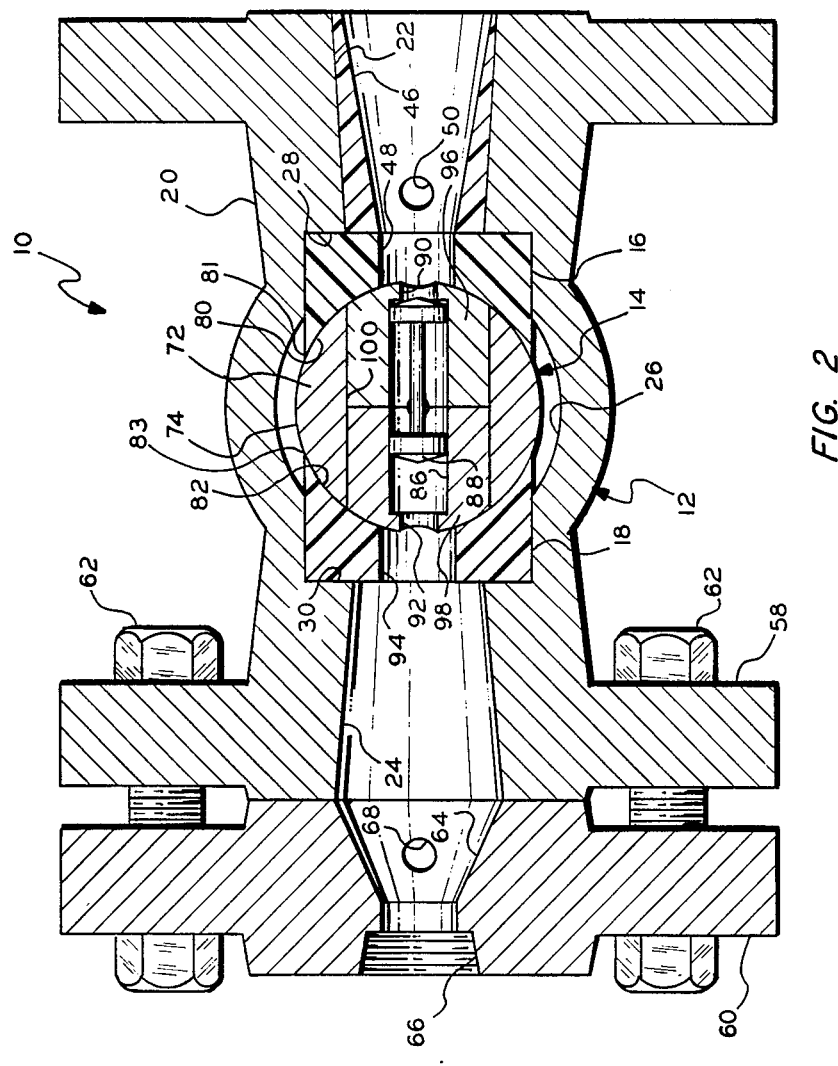
FIG. 2 is a horizontal cross-sectional view taken along line 2—2 of FIG. 1.

Referring now to the drawings, apparatus for controlling the flow of material therethrough constructed in accordance with the present invention is illustrated therein and is generally designated by the reference character 10. The apparatus 10 comprises a valve body assembly 12 and a valve member assembly 14. Preferably, the apparatus 10 further includes an annular inlet seal 16 and an annular outlet seal 18.

The valve body assembly 12 comprises a valve body member 20 having an inlet port 22 and an outlet port 24 which communicate with a valve chamber 26 in the medial portion of the valve body member 20. The inlet and outlet ports 22 and 24 are preferably coaxially aligned. The valve chamber 26 is preferably formed with recess 28 in the inner surface thereof coaxial with the inlet port 22, and is further preferably provided with recess 30 formed in the inner surface thereof coaxial with the outlet port 24. The annular inlet seal 16 and annular outlet seal 18 are sealing received in the recesses 28 and 30, respectively, when used.

The top of the valve chamber 26 is preferably closed by a removable cap 32 which is secured to the valve body member 20 by suitable means such as a plurality of threaded cap screws 34. A fluid-tight seal is achieved between the cap 32 and the valve body member 20 by means of a gasket or seal 36. An opening 38 is provided in the cap 32 through which the valve stem 40 of the valve member assembly 14 extends. A suitable seal is provided between the valve stem 40 and the opening 38 by means of a suitable packing assembly 42 which is received in a corresponding annular recess 44 formed in the inner surface of the cap 32 coaxial with the opening 38. The packing assembly 42 may suitably comprise a plurality of chevron-type annular packing elements formed for a suitable material such as, for example, Teflon ® brand poly(tetrafluroethylene).

The valve body assembly 12 preferably further includes a tubular insert 46 fixedly secured within the inlet port 22. The tubular insert 46 provides a converging, frustoconically shaped transition with the inlet port 22 to a diameter substantially equal to the diameter of an inlet passage 48 through the annular inlet seal 16. The tubular insert 46 can be made of any suitable material which will hold up in service to any abrasive action of the material which is to be passed through the apparatus 10. Suitable materials include synthetic polymeric materials such as polymers and copolymers comprising the monomer ethylene, with ultrahigh molecular weight polyethylene being a presently preferred material for the tubular insert 46.

In one embodiment of the invention there is provided a means 49 for introducing fluid into the inlet port 22. Preferably the means 49 comprises a passage 50 which communicates between the exterior of the valve body member 20 and the interior of the inlet port 22 and tubular insert 46 when used. The passage 50 is preferably provided with an internally threaded fitting 52 on the exterior of the valve body member 20 which provides means for connecting the passage 50 in fluid flow communication with a source of fluid (not shown).

A means 53 is provided for introducing fluid into the valve chamber 26 in one embodiment of the invention. The means 53 preferably comprises a passage 54 which communicates between the exterior of the valve body member 20 and the valve chamber 26 between the inlet port 22 and the outlet port 24. The passage 54 is also preferably provided with an internally threaded fitting 56 which provides means for connecting the passage 54 in fluid flow communication with a source of fluid (not shown).

The valve body assembly 12 can include a flanged extension 60. When used, the flanged extension 60 can be attached to the assembly 12 by means of a plurality of threaded fastening devices 62 which preferably join the extension 60 with an outlet flange 58 of the assembly 12. The flanged extension 60 is provided with a central opening 64 which is coaxial with and provides an extension to the outlet port 24. The central opening 64 preferably converges downstream from the outlet port 24 and preferably terminates in an internally threaded portion 66 which provides convenient means for connecting the outlet end of the apparatus 10 to a suitable conduit for removal of material passed through the apparatus.

In one embodiment of the invention, there is provided a means 67 for introducing fluid into the central opening 64. The means 67 comprises a passage 68 which communicates between the exterior of the valve body assembly 12 and the interior of the central opening 64 most preferably closely adjacent (not shown) the outlet port 24. The passage 68 communicates with an internally threaded fitting 70 which provides means for connecting the passage 68 in fluid flow communication with a source of fluid (not shown).

The valve member assembly 14 is further characterized to include a longitudinal axis about which the assembly 14 is rotated and a rotor 72 of generally circular cross-section to which the previously mentioned valve stem 40 is drivingly secured and in longitudinal alignment therewith. The rotor 72 of the valve member assembly 14 preferably has a frustoconically shaped, outer surface 74 which tapers from a first end 76 which is connected to stem 40 to a second opposite end 78. The rotor 72 of the valve member assembly 14 is disposed within the valve chamber 26 and the outer surface 74 thereof is closely received between the outlet of the inlet port 22 and the inlet of the outlet port 24, preferably between respective corresponding saddle-shaped sealing surfaces 80 and 82 of the annular inlet and outlet seals 16 and 18. Sealing contact is maintained in a preferred embodiment of the invention between the outer surface 74 and the sealing surfaces 80 and 82 by means of a plurality of belleville washers 84 disposed about the valve stem 40 intermediate the packing assembly 42 and the first end 76 of the rotor 72. The belleville washers 84 maintain a fluid tight seal between the valve stem 40 and the removable cap 32 by maintaining a compressive force on the packing assembly 42 in the annular recess 44. The seals 16 and 18 can be made of any suitable material which will provide the desired sliding seal with the outer surface 74 of the rotor 72 and acceptable service life when handling the material being controlled by the apparatus 10. Such materials include synthetic polymeric materials, with glass reinforced Teflon ® brand poly(tetrafluroethylene) being a presently preferred material for handling abrasive materials.

A transverse passage 86 extends preferably diametrically through the rotor 72 of the valve member assembly 14. The passage 86 has a first end and a second end where it opens onto the outer surface 74 of the rotor 72. The passage 86 is preferably circular in cross section and carries a piston 88 slidably disposed therein. The diametrical dimension of the transverse passage 86 at each end is preferably less than the minimum width of the sealing surface 80 of the annular inlet seal 16 measured circumferentially between the inlet passage 48 and the outer periphery 81 of sealing surface 80 and less than the minimum width of the sealing surface 82 of the annular outlet seal 18 measured circumferentially between the outlet passage 94 and the outer periphery 83 of the sealing surface 82. This relationship between the maximum diametrical dimensions of the transverse passage 86 at its points or lines of communication with the outer surface 74 of the rotor 72 and the width of the sealing surfaces 80 and 82 prevents the discharge of any materials carried within the transverse passage 86 into the valve chamber 26 during rotation of the rotor 72 as a result of any differential pressure between the interior of the inlet port 22 and the cavity 26.

A generally longitudinally extending second passage 110 in the rotor 72 intercepts the transverse first passage 86. Preferably, the second passage extends generally along the longitudinal axis of the valve member assembly 14 from the second end 78 of the rotor 72 to the center of the passage 86 to define an open flow path from the valve chamber 26 to the transverse passage 86. The second passage 110 is preferably cylindrically shaped and has a diameter somewhat smaller than the diameter of first passage 86.

The piston 88 is preferably generally dumbbell-shaped and has a first generally cylindrical enlarged portion 112 adjacent a first end 114 thereof and a second generally cylindrical enlarged portion 116 adjacent a second end 118 thereof. The piston 88 is retained within the transverse passage 86 by means of radially inwardly extending annular shoulders or seats 90 and 92 which are abuttable with the enlarged end portions 112 and 116 of the piston 88. Preferably, the first end 114 of the piston 88 is generally cone-shaped and the second end 118 of the piston 88 is generally cone-shaped so that the ends of the piston will form a seal with the seats 90 and 92, respectively, when the piston 88 is positioned at the ends of the transverse passage 86. The generally cylindrical enlarged portions 112 and 116 of the piston 88 are separated by a reduced diameter midportion of the piston 88 such as shaft 120 which is preferably generally cylindrically shaped and has a length greater than about 50% of the length of the transverse passage 86, excluding seats 90 and 92. By having such length, some part of the shaft portion 120 of the piston 88 will always be adjacent the opening of the second passage 110 into the transverse passage 86. The length of the generally cylindrical enlarged portions 112 and 116 is preferably kept short in order to reduce friction and minimize plugging. For example, a suitable length would be less than about 10% of the length of the transverse passage. The diameter of the generally cylindrical enlarged portions 112 and 116 is generally not closely received by the diameter of the passage 86 so that a small, annularly shaped flow passage is maintained between the passage 110 and the outlet port 24 around the enlarged end portions 112 and 116 of the piston. For example, utilizing a piston having a diameter at the enlarged end portions in the range of 90 to 99.5% of the diameter of the transverse passage 86 would be expected to provide reasonably good results in clearing the passage 86 of particulate when operating with fluid injection through the passage 110 ranging from viscous liquids to light gases over various pressure ranges.

As illustrated in FIG. 1, the transverse passage 86 is preferably defined by a pair of generally cylindrically or tubularly shaped inserts 96 and 98 which are fixedly secured by suitable means within a transverse bore 100 extending through the longitudinal axis of rotation of the rotor 72. The use of interchangeable inserts 96 and 98 defining various diameters of the transverse passage 86 provides means for varying the capacity within the transverse passage 86 for metering a precise quantity of material being passed through the apparatus 10 upon each half rotation of the rotor 72. The size of the slugs metered by the apparatus 10 can also be varied by changing the length of the shaft 120 of the piston 88.

The outer end of the valve stem 40 is preferably provided with a pair of wrench flats 102 or other suitable means for drivingly connecting the valve stem 40 to suitable drive means for rotating the valve member assembly 14 within the valve body assembly 12.

Generally speaking, the invention provides a method for controlling the passage of particulate material through a structure of the type which can be described above and includes a valve body means, a valve member means, and a piston. The valve body means defines a valve chamber having an inlet port and an outlet port positioned across the valve chamber from each other and communicating between the valve chamber and the exterior of the valve body means. The valve member means has a transverse passage therethrough and is positioned in the valve chamber so that the transverse passage extends between the inlet port and the outlet port. The valve member means is rotatable in the valve chamber from a first position in which a first end of the transverse passage is adjacent the inlet port and a second end of the transverse passage is adjacent the outlet port to a second position in which the second end of the transverse passage is adjacent the inlet port and the first end of the transverse passage is adjacent the outlet port. Preferably, the valve member means pauses in rotation, preferably in the horizontal position, between the first position and the second position to block the transverse passage from communication with the inlet port and the outlet port to prevent leakage between the load/dump cycles. The piston is slidably mounted in said transverse passage and moveable from a first position adjacent a first end of the transverse passage to a second position adjacent the second end of said transverse passage.

In the process of using this apparatus, particulate material is introduced from the inlet port into the first end of said transverse passage. The piston is displaced from adjacent the first end of the passage to adjacent the second end of the passage. The valve member means is then rotated from the first position to the second position. Additional particulate material is introduced from the inlet port into the second end of said transverse passage. The piston is thereby displaced from adjacent the second end of the passage to adjacent the first end of the passage. The particulate material previously introduced into the first end of the passage is thereby forced into the outlet port. A fluid is introduced into the transverse passage at a position between the first end of the transverse passage and the second end of the transverse passage. A portion of the thus introduced fluid is flowed annularly around the piston and into the outlet port. Residual particulate material is thereby flushed from the transverse passage. The valve member means can then be rotated from the second position back to the first position to restart the cycle.

The apparatus 10 can be advantageously employed in a system for automatically feeding precisely controlled amounts of particulate catalyst to a continuous catalytic reaction. Such a process employing automatic catalyst feeding is disclosed in U.S. Pat. No. 3,219,208, the disclosure of which is incorporated herein by reference. During such operation of the apparatus 10, a suitable lubricating and flushing fluid is provided from a suitable fluid source (not shown) at a suitable pressure to the valve chamber 26 of the valve body assembly 12 via fitting 56 and passage 54. Such lubricating fluid is provided at a pressure sufficient to overcome the working pressure applied to the valve member assembly 14 so that the lubricating fluid provides lubricating action between the valve rotor 72 and the sealing surfaces 80 and 82 of the annular inlet and outlet seals 16 and 18. A portion of the lubricating fluid flows from the chamber 26, through the passage 110 and into the passage 86 around the shaft 120, and then through the annulus between the inside of the passage 86 and the outside diameter of the enlarged end portion 116 of the piston which is adjacent the outlet port 24, and then into the outlet port 24. This portion of the lubricating fluid cleans the passage 86 of residual material and enables the metering of small slugs of particulate material. Once the piston has been urged to adjacent the outlet end of the transverse passage due to completion of the loading cycle at the inlet end, the flow of fluid will be reduced by the seating of the cone end of the piston 88 against the seat 92. If desired, flushing fluids may also introduced from one or more suitable fluid sources (not shown) at suitable pressures generally transversely into the inlet port 22 via fitting 52 and passage 50 as well as into the outlet port 24 and extension thereof defined by the central opening 64 via fitting 70 and passage 68. Suitable lubricating and flushing fluids as well as the flushing fluids applied to the inlet and outlet ports 22 and 24 include, but are not limited to, hydrocarbons employed in the polymerization process, e.g., isobutane, isopentane, cyclohexane or mixtures of any two or more thereof, or a non-poisonous lubricating oil, e.g., pump seal mineral oil, to both prevent catalyst entry into the valve chamber 26 and to reduce friction and abrasive wear between the valve rotor 72 and annular inlet and outlet seals 16 and 18, and to additionally facilitate the flow of catalyst through the inlet and outlet ports 22 and 24 of the apparatus 10. The utilization of such suitable fluids substantially reduces the required valve operating torque and greatly prolongs the operating life of the apparatus 10. It is preferred that the lubricating fluid be the same as fluid already in use in the process to which the material is being metered and that no fluids be introduced into the passage 50 when fluid injection via passage 110 is employed and that a continuous controlled amount of fluid be introduced into the passage 68 generally at a somewhat lower pressure than the fluid to line 54, to flush the catalyst into the reactor.

While the apparatus 10 is advantageously employable for the automatic control of the feeding of catalyst to a catalytic reaction, it will be understood that the apparatus structure herein disclosed can also be advantageously employed in the construction of tapered plug valves used in other applications. A significant advantage provided by the apparatus 10 is its capacity to maintain a constant, low-friction sliding sealing engagement between the tapered valve plug or rotor and the corresponding tapered sealing surfaces 80 and 82 of the annular inlet and outlet seals 16 and 18 which is extremely advantageous in the handling of both liquids and particulate solids, especially when such liquids or particulate solids are particularly abrasive, and the ability of the apparatus to meter very small slugs of such materials in a reliable manner. An example of where metering small slugs of material with high frequency is desirable over metering large slugs of material less frequently occurs during the feeding of catalysts for exothermic reactions, where feeding large slugs of catalyst causes temperature spiking.

From the foregoing detailed description of the apparatus of the present invention, it will be seen that the apparatus effectively overcomes the deficiencies of similar prior devices and provides significant advantages thereover. It will be further understood that the present invention can be advantageously employed in feeding the catalysts disclosed in U.S. Pat. No. 4,325,837, the disclosure of which is incorporated herein by reference. Changes may be made in the combination and arrangement of parts or elements as heretofore set forth in the specification and shown in the drawings without departing from the spirit and scope of the invention as defined in the following claims.

That which is claimed is:

1. A valve comprising:
    valve body means defining a valve chamber and having an inlet port and an outlet port, each of said ports communicating between said valve chamber and the exterior of said valve body means;
    valve member means being disposed within said valve chamber and being closely received between the inlet port and the outlet port, said valve member means having longitudinal axis and being adapted to rotate about its longitudinal axis within said valve chamber, said valve member means having an outer surface and first and second opposite ends with a transverse first passage extending diametrically through said valve member means, said transverse first passage having a first end and a second end each opening onto the outer surface of the valve member means, said valve member means further having a generally longitudinally extending second passage which opens into the first passage between the first end and the second end thereof and a dumbbell shaped piston positioned in the transverse passage.

2. A valve as in claim 1 further comprising inlet seal means positioned at an outlet of the inlet port, said inlet seal means having an inlet passage therethrough establishing a flow path between the inlet port and the first end of the transverse flow passage, said inlet seal means sealingly engaging the inside surface of valve body means and the outer surface of the valve member means; and
    outlet seal means positioned at an inlet of the outlet port, said outlet seal means having an outlet passage therethrough establishing a flow path between the outlet port and the second end of the transverse flow passage, said outlet seal means sealingly engaging the inside surface of the valve body means and the outer surface of the valve member means.

3. A valve in accordance with claim 2 characterized further to include:
   a third passage communicating between said valve chamber and the exterior of said valve body means, said third passage opening into the valve chamber between the inlet port and the outlet port; and
   connecting means connecting said third passage with a source of fluid whereby fluid from said source flows through said connecting means and the third passage and into said valve chamber and a portion of said fluid flows through the generally longitudinally extending second passage and into the transverse first passage.

4. A valve in accordance with claim 3 characterized further to include:
   means located within each end of the transverse first passage for retaining said dumbbell-shaped piston within said transverse first passage and limiting the longitudinal movement of said dumbbell-shaped piston within the transverse passage; wherein said dumbbell-shaped piston has a first generally cylindrical enlarged end portion adjacent a first end thereof and a second generally cylindrical enlarged end portion adjacent to a second end thereof and a reduced diameter midportion connecting said enlarged end portions.

5. A valve in accordance with claim 4 wherein the reduced diameter midportion of the dumbbell-shaped piston comprises a shaft which has a length of at least 50% of the length of the transverse first passage as measured between the first end of the transverse passage and the second end of the transverse passage.

6. A valve as in claim 5 wherein each generally cylindrical enlarged end portion of the dumbbell-shaped piston has a length of less than about 10% of the length of the transverse first passage.

7. A valve as in claim 6 wherein the outer surface of the valve member means is generally frustoconically shaped and the ends of the dumbbell-shaped piston are generally cone-shaped.

8. A method for controlling the passage of particulate material through a structure of the type which includes a valve body means defining a valve chamber having an inlet port and an outlet port positioned across the valve chamber from each other and communicating between the valve chamber and the exterior of the valve body means, a valve member means having a transverse passage therethrough positioned in the valve chamber so that the transverse passage extends between the inlet port and the outlet port, said valve member means being rotatable in the valve chamber from a first position in which a first end of the transverse passage is adjacent the inlet port and a second end of the transverse passage is adjacent the outlet port, to a second position in which the second end of the transverse passage is adjacent the inlet port and the first end of the transverse passage is adjacent the outlet port; and a piston slidably mounted in said transverse passage and moveable from a first position adjacent a first end of the transverse passage to a second position adjacent the second end of said transverse passage; said process comprising:
   introducing particulate material from the inlet port into the first end of said transverse passage and displacing the piston from adjacent the first end of the passage to adjacent the second end of the passage;
   rotating the valve member means from the first position to the second position;
   introducing particulate material from the inlet port into the second end of said transverse passage and displacing the piston from adjacent the second end of the passage to adjacent the first end of the passage thereby conveying the particulate material introduced into the first end of the passage into the outlet port;
   introducing a fluid into the transverse passage at a position between the first end of the transverse passage and the second end of the transverse passage; and
   flowing a portion of the thus introduced fluid annularly around the piston and into the outlet port.

9. A method in accordance with claim 8 wherein said fluid is a liquid, and the valve member pauses between rotation between the first position and the second position so as to block the transverse passage from communication with the inlet port and the outlet port.

10. A method in accordance with claim 9 wherein said particulate material comprises a catalyst for use in a catalytic reaction, and said fluid is a liquid diluent of said particulate catalyst which does not adversely affect the catalyst reaction.

11. A method as in claim 9 wherein the piston has a first end and a second end and is generally dumbbell shaped, with a shaft of reduced diameter between two enlarged piston end portions, wherein the fluid is introduced into the transverse passage at a location adjacent the shaft of the dumbbell-shaped piston.

* * * * *